United States Patent [19]

Smith et al.

[11] Patent Number: 4,870,858
[45] Date of Patent: Oct. 3, 1989

[54] TIRE TESTING MACHINE

[75] Inventors: Patrick A. Smith, Northfield; Glen Thompson, Akron, both of Ohio

[73] Assignee: Eagle-Picher Industries, Inc., Cincinnati, Ohio

[21] Appl. No.: 260,494

[22] Filed: Oct. 21, 1988

[51] Int. Cl.⁴ .......................................... G01M 17/02
[52] U.S. Cl. ...................................................... 73/146
[58] Field of Search ............................. 73/146, 7, 8, 9

[56] References Cited

U.S. PATENT DOCUMENTS 3,797,306  3/1974  Peterson et al. ...................... 73/146
4,233,838  11/1980  Stiebel ................................. 73/146
4,366,707  1/1983  Jarschel .............................. 73/146
4,489,598  12/1984  Beebe ................................. 73/146

Primary Examiner—Donald O. Woodiel
Attorney, Agent, or Firm—Wood, Herron & Evans

[57] ABSTRACT

A tire testing machine has two spaced parallel diamond shaped support structures. On each support structure, a road wheel and two tire carriages are mounted. A motor is mounted on each support structure and drivably connected to the road wheel. Pistons and cylinders are mounted between the support structures and the carriages to drive the carriages toward and away from the road wheel to force the tire carried on the carriage against the road wheel.

6 Claims, 4 Drawing Sheets

TIRE TESTING MACHINE

This invention relate to a tire testing machine, that is, a machine in which tires are forced against a rotating road wheel and run at preselected speeds and loading pressures to determine whether a tire achieves a minimum standard of life.

One known tire testing machine has a large generally rectangular elongated frame. Two road wheels are rotatably mounted on either side of the frame at about the center of the frame. The road wheels are about six feet in diameter. A pair of motors are mounted on top of the frame and connected by belts to drive the road wheels independently of each other. Two opposed tire wheel carriages are mounted on opposite sides of each road wheel. The carriages are slidably mounted to move toward and away from the road wheels to carry the tires into engagement with the road wheels. Each carriage has a piston and cylinder for hydraulically applying the tire against the road wheel at a predetermined force.

With this apparatus four tires can be tested simultaneously. Usually one side of the machine is set up for truck and bus tires. The cylinders are capable of loading those tires against the road wheels at up to 20,000 pounds. On the other side, passenger tires are tested. Smaller pistons and cylinders are provided to load the passenger tires against the road wheels at 5,000–10,000 pounds.

The tires are run at a fairly high speed, for example over 100 mph. The tires are usually run to destruction although a tire can be taken off the machine after it has run significantly past a predetermined minimum length of time.

Some tires are high speed rated. These must be run at high speeds. On the existing machine, as described above, the highest speed attainable has been about 185 miles an hour. It is desired to run tires at at least 200 mph and as high as 250 mph. One factor that limits the speed at which the tires can be run is the natural frequency of the machine. If a tire is run at the natural frequency of the machine, the machine will resonate and ultimately destroy itself.

One objective of the present invention has been to provide an improved frame for supporting the operating elements, the improved frame raising the natural frequency of the machine so that tires can be run at speeds at least as great as 200 mph and even up to 250 mph.

The force by which the tire is pressed against the road wheel must be known. One approach has been to place load cells around the axle or spindle on which the wheel to be tested is mounted. That is a costly arrangement for the mounting of the load cells. A less costly way of mounting the load cells would be to use off-the-shelf load cells mounted at the point where the piston and cylinder apply force to the carriage on which the wheel is mounted. The problem with that arrangement is that when forces of the magnitude required for tire testing are applied, the carriage on which the wheel is mounted will tend to bow and bind against the ways upon which is it slidably mounted.

It has therefore been another objective of the present invention to provide an improvement in the mounting of the carriage and load cells associated with the carriage to permit the use of less costly load cells and the arrangement for mounting them.

Several objectives of the present invention are attained in two major areas of improvement. In the first area of improvement, the rectangular frame on which the major components are mounted has been replaced by a generally diamond shaped frame including, at each end of the diamond, a triangular truss having a vertical base at the central portion of the machine where the load wheels are mounted and an apex where the piston and cylinder are mounted for driving the carriage against the road wheel. The formation of the frame through the use of triangular trusses arranged as stated results in a machine having a much higher natural frequency than was heretofore possible. Through the use of the triangular truss frame, much higher speeds of tire testing are possible, perhaps as great as 250 mph.

Further, the slidable carriages are mounted to the main frame by means of vertically oriented thin compliant webs which are permitted to flex slightly under the loading applied by the cylinder to the slidable carriages. By taking up the stress of applying a force to the tire through the carriage in the compliant webs, the tendency of the carriage to bow and bind is accommodated without binding. When the binding of the carriage on its ways is eliminated, comparatively inexpensive load cells can be mounted between the hydraulic cylinder and the carriage. With this mounting, all of the indicated force on the carriage can be attributed to the force of the tire against the road wheel and none of it will be attributed to the binding of the carriage on the supporting structure.

Several features and objectives of the present invention will become more readily apparent from the following detailed description taken in conjunction with the accompanying drawings in which.

Figure 1:
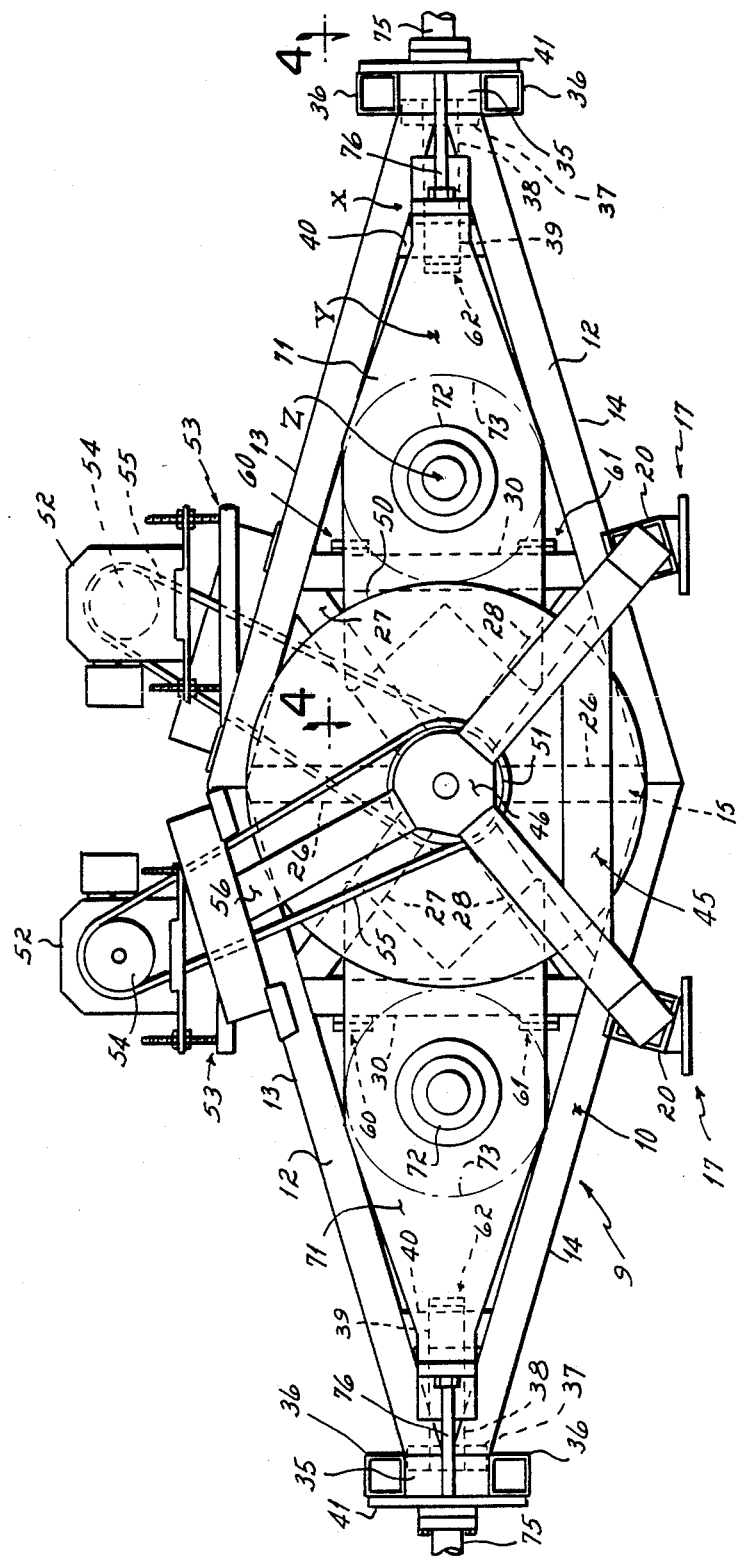
FIG. 1 is a side elevational view of the tire testing machine of the present invention.
Figure 2:
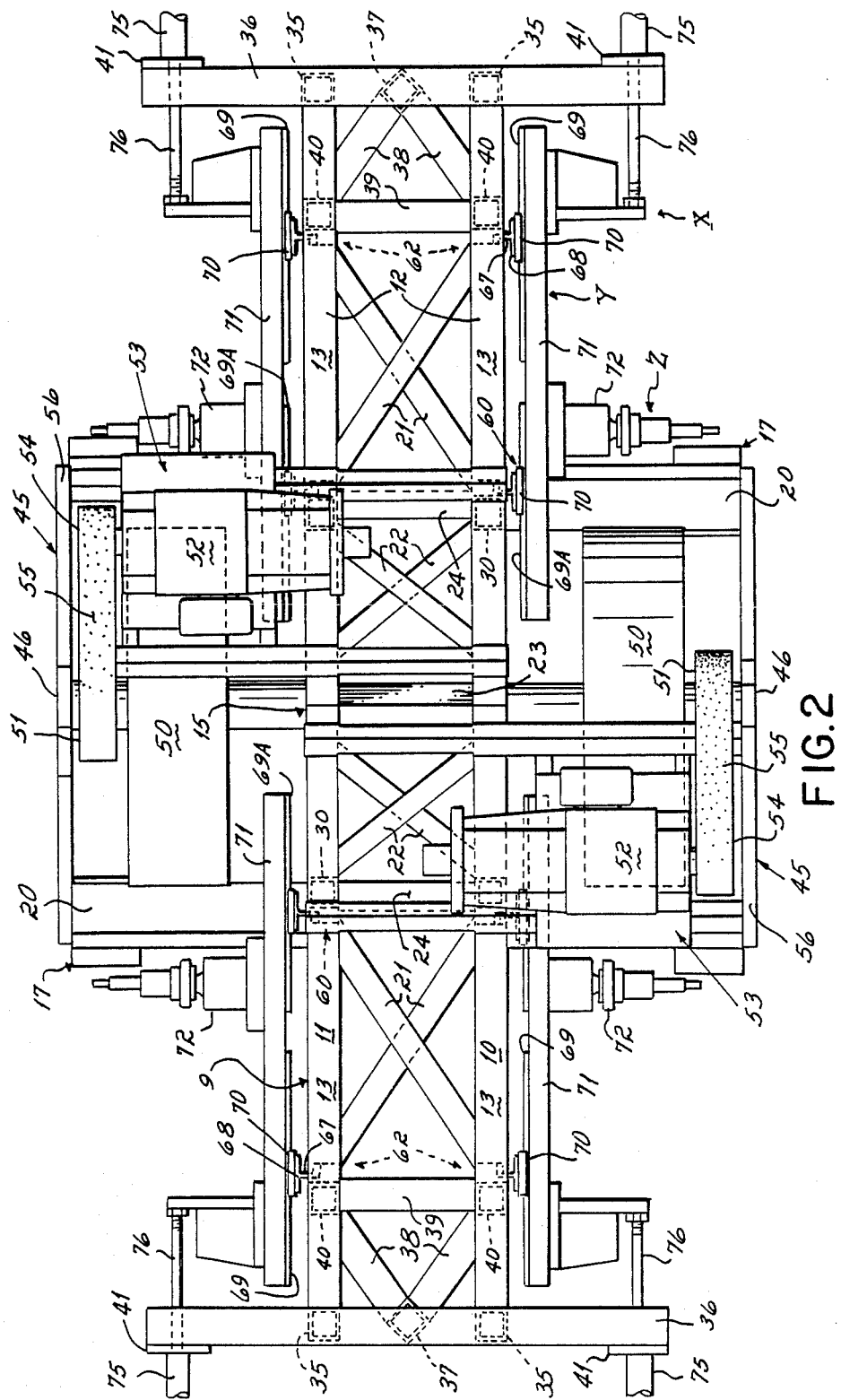
FIG. 2 is a top plan view of the invention.

Referring to FIGS. 1 and 2, the basic framework 9 for the tire testing machine consists of two diamond shaped frames 10, 11 which are disposed in spaced parallel relation. Each frame is formed by two triangularly shaped trusses 12. Each truss has an upward inclined beam 13, a lower inclined beam 14 and a vertical base 15. In the illustrated form of the invention it can be seen that the two trusses 12 share a common vertical base 15. It should be understood that each truss could have its own base with the bases being joined together by cross members to form a rectangular box-like structure.

The diamond shaped frames 10 and 11 are secured to a base 17 consisting of two transverse hollow beams 20.

Figure 3:
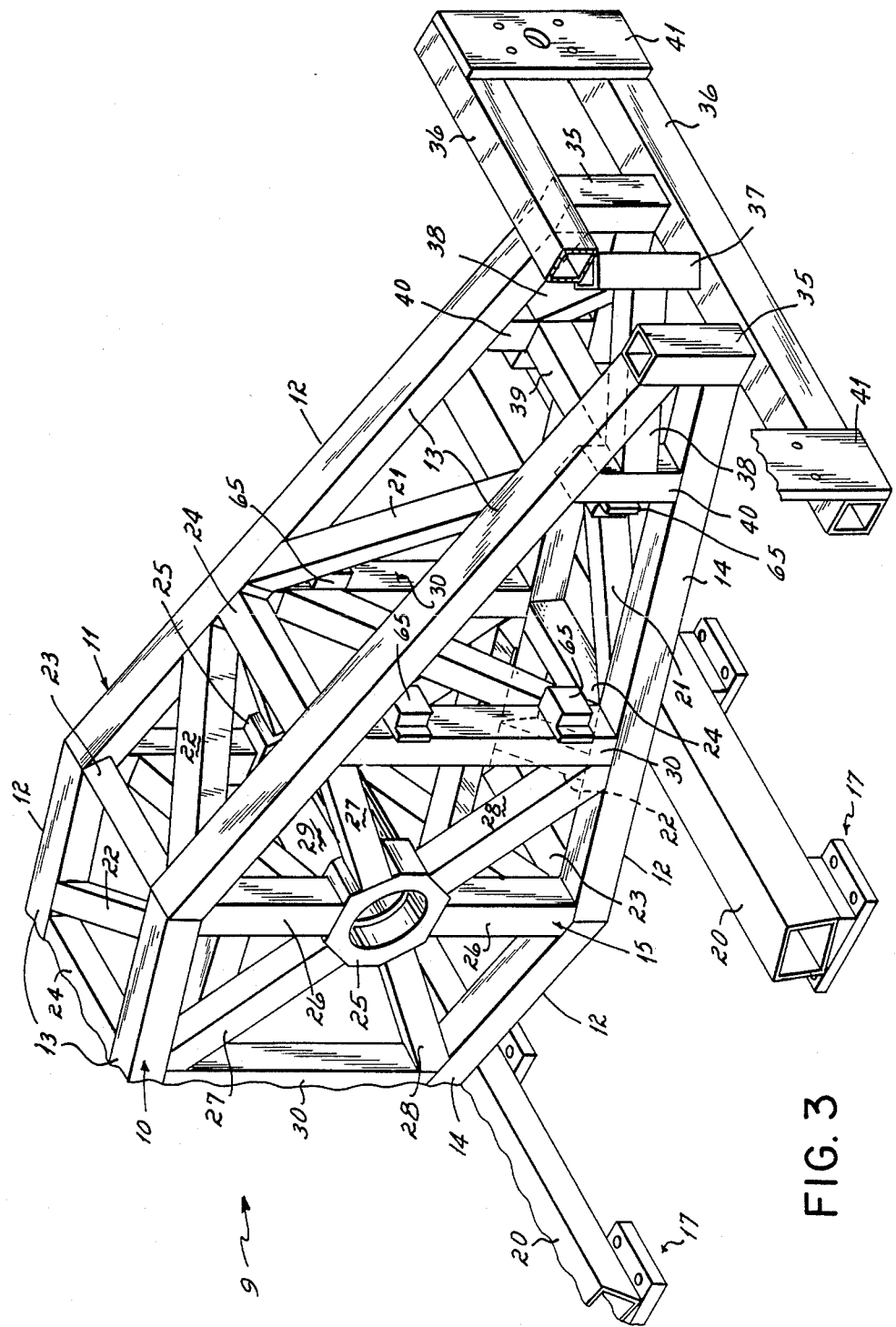
FIG. 3 is an isometric view of the supporting framework.

The two diamond shaped frames are interconnected by diagonal cross braces 21 and 22 (FIGS. 2 and 3) and a central transverse brace 23 and intermediate transverse braces 24.

At the center of each diamond 10 is an octagonal bearing plate 25. The two bearing plates are joined together by a tube 29. Each bearing plate forms a part of the common vertical base 15 and is connected by short vertical columns 26 to complete the formation of the common base 15 for the trusses 12. Upper diagonal tubular braces 27 extend between the upper beams 13 and the bearing plate 25. Similarly, lower tubular braces 28 extend between the lower beams 14 and the bearing plate 25.

Vertical tubular columns 30 extend between the upper beam 13 and the lower beam 14 of each truss.

At each end of the composite frame 9, the ends of the upper and lower beams 13 and 14 are welded to a vertical post 35. Transverse tubular beams 36 are welded across the upper and lower ends of the posts 35. A center vertical post 37 is welded between the transverse beams 36. Diagonal braces 38 are each connected at one end to the center post 37. The other ends are connected to vertical posts 40 and a transverse brace 39 thereby forming a triangular truss among the braces 38 and 39. The vertical posts 40 are connected between the upper and lower beams 13 and 14 and are also connected to the transverse brace 39. The vertical posts 30 and 40 provide the structure to which the slidable wheel carrying carriages are mounted as will be described below.

A plate 41 is connected across each of the ends of beams 36 to provide a mounting for the hydraulic cylinder that drives the wheel carriage.

An outboard triangular truss 45 is secured to the base beams 20. At the apex of the truss 45 is a bearing 46. A road wheel 50 is rotatably mounted between the bearing 46 and the bearing plate 25 on each side of the frame 9. The road wheel has a pulley 51 fixed to it. A motor 52 is mounted on a platform 53 secured to the upper beams 13 on frame 10 at one side of the machine and upper beam 13 on frame 11 at the other side of the machine. The motor 52 has a pulley 54 which is connected by a belt 55 to the pulley 51 thereby forming a driving connection between the motor and the road wheel 50 on each side of the machine. The outboard end of platform 53 is supported by a brace 56 extending between the bearing 46 and the platform 53.

Each triangular truss 12 has upper and lower inboard compliance mounts 60 and 61 fixed to vertical post 30 and an outboard compliance mount 62 fixed to vertical post 40. As shown in FIGS. 3-6, each compliance mount is secured to a plate 65 welded to the respective posts 30 or 40. The compliance mount has an integral block 66 bolted to the plate 65, a flexible web 67 integral with the block 66 and a vertical plate 68 perpendicular to the web 67 and integral therewith.

A linear bearing casing 70 is secured to the plate 68. A slidable carriage 71 has a central way 69, and upper and lower ways 69A that are slidably mounted in the bearing casing 70 of each compliance mount.

Each carriage 71 has a rotatable spindle 72 adapted to receive a tire wheel 73 (shown in phantom in FIG. 1). The wheel 73 is aligned with the road wheel 50.

A hydraulic cylinder 75 is mounted on plate 41 at the ends of beams 36. Each carriage 71 is connected to a respective hydraulic cylinder 75 by a piston rod 76. The axis of the cylinder and the piston rod are in alignment with the center of the road wheel. A load cell (not shown) is connected between the piston 76 and each carriage 71 to measure the force applied by the hydraulic cylinder to the carriage.

Figure 4:
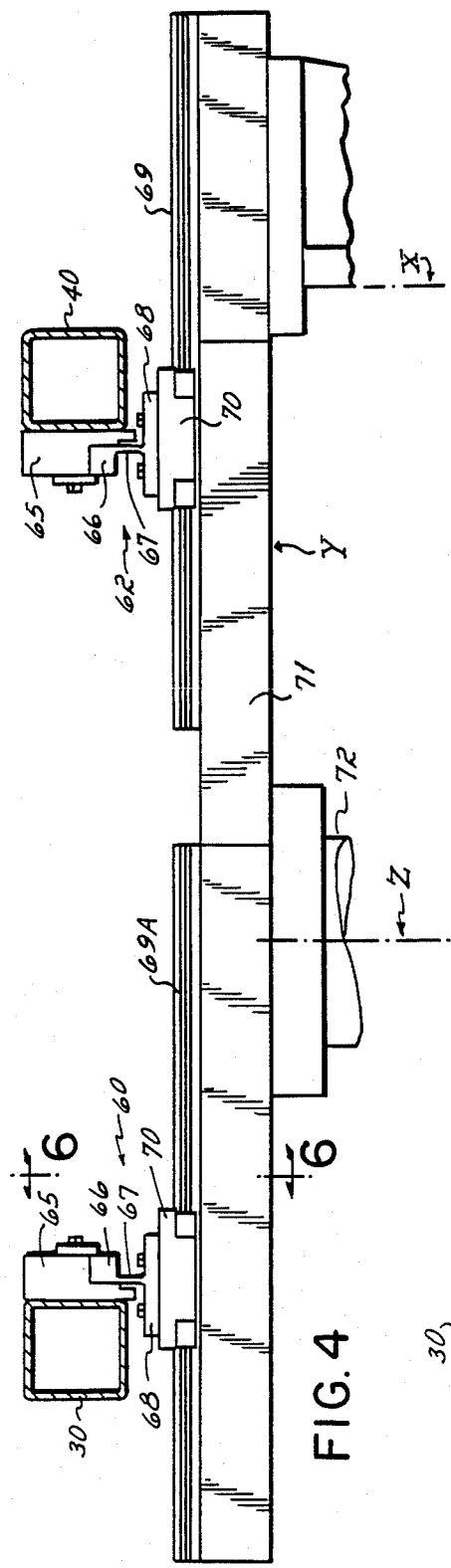
FIG. 4 is a cross sectional view taken generally along lines 4—4 of FIG. 1.
Figure 6:
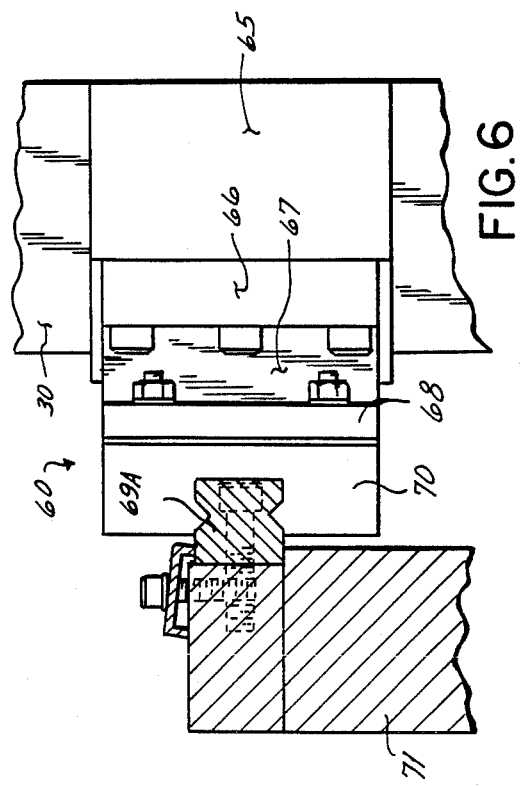
FIG. 6 is a cross sectional view taken on lines 6—6 of FIG. 4.
Figure 5:
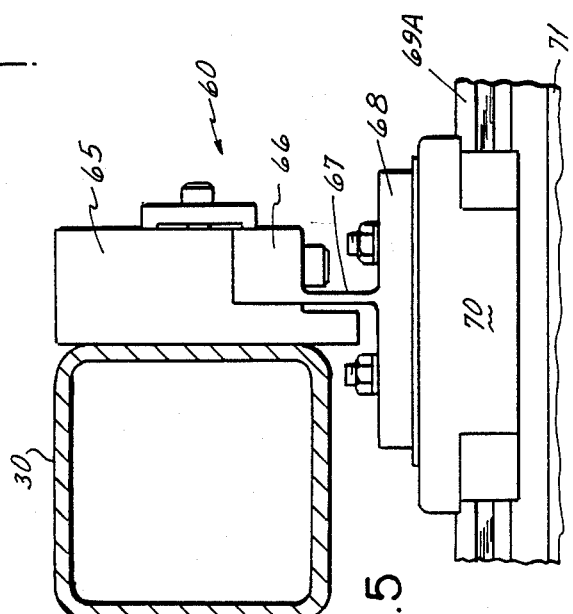
FIG. 5 is an enlarged view of a portion of the left side of FIG. 4.

From FIGS. 2 and 4 it can be seen that that force goes through a generally C-shaped path having legs X, Y and Z. When pressure up to 20,000 pounds is applied against element X to be transmitted through element Y to element Z, element Y will be stressed to cause it to flex. Element Y is basically a major part of the carriage 71. If the carriage 71 flexes, its ways would normally bind in their bearings. However, by mounting the bearing casings on the compliant mounts, and specifically the vertical webs 67, the mounts will flex with the ways so that even if there is a flexing of the carriage 71, the mounts that support it will flex with it so that there is no binding. Thus, whatever force is measured between the piston rod and the carriage will be substantially the force that the tire applies to the road wheel 50.

By concentrating the heavy structure at the center of the testing machine where the more greatly stressed components are located, and by reducing the structure at the ends of the diamond shaped frames 10 and 11, the natural frequency of the testing machine is significantly raised so that the testing machine can be run at up to 250 mph (effective speed between the road wheels and tires) without reaching the natural frequency of the machine.

In the operation of the machine, a carriage 71 is withdrawn toward the end of the frame 9. A tire is mounted on the carriage. The road wheel is caused to rotate at the preselected rpm for which the tire is to be tested. The hydraulic cylinder then forces the tire against the road wheel at the preselected pressure at which the tire is to be tested. The tire is run at that speed and pressure at least until a preselected minimum number of revolutions is attained or until the tire destructs. If the tire exceeds the minimum, then it is known that the tire has met the standard for which the tire had been designed.

I claim:

1. A tire testing machine comprising:
   a pair of horizontally extending triangular trusses joined together to form a frame having horizontally extending apexes at each end;
   a road wheel mounted at the center of said frame on a transverse axis;
   a motor mounted on said frame and drivably connected to said road wheel;
   two tire carriages;
   means slidably mounting each said carriage on a respective truss for horizontal movement toward and away from said road wheel; and
   load applying means between said truss and carriage for moving said carriage toward said road wheel and applying force between a tire on said carriage and said road wheel.

2. A tire testing machine as in claim 1,
   one of said trusses having an upwardly inclined element forming a structural element of said triangular truss,
   said motor being mounted on said upwardly inclined element; and
   a belt connecting said motor to said road wheel.

3. A tire testing machine of claim 1 further comprising:
   at least two carriage supports on each truss, each carriage support comprising
   a horizontal rail on said carriage,
   a linear bearing casing mounted on said rail,
   a thin vertical web connecting said casing to said truss, said vertical web being adapted to flex when a force is applied to said carriage to load a wheel onto said road wheel; and
   means for measuring the force applied to said carriage.

4. A tire testing machine comprising:
   a frame;
   a road wheel mounted on said frame and a motor for rotating said road wheel;

a carriage and wheel spindle mounted on said frame for movement toward and away from said road wheel;

said carriage having a plurality of longitudinal ways;

a linear bearing casing receiving each said way for sliding movement;

a thin compliant web lying in a plane perpendicular to said ways and connecting said casing to said frame;

a hydraulic piston and cylinder connected between said frame and carriage to force said carriage toward said road wheel, the axis of said piston and cylinder being aligned with said spindle and the center of said road wheel; and means for measuring the force between said piston and cylinder and said carriage.

5. A tire testing machine comprising:

two spaced parallel diamond shaped support structures, each support structure formed by two triangular trusses each having a vertical base;

a pair of spaced parallel transverse beams forming a base, said diamond structures each having lower structural elements fixed to said base;

a pair of road wheels independently mounted on respective diamond shaped structure at the center thereof;

a motor mounted on each support structure and drivably connected to a respective road wheel; and four tire wheel carriages, two of said carriages being mounted on each side of said support structure and on opposite sides of a respective road wheel, means mounting said carriages for movement toward and away from said road wheel.

6. A tire testing machine as in claim 5 further comprising:

a road wheel triangular truss at each side of said support structure and having a base supported on said transverse beams, each said road wheel having an axle supported between said vertical base and the apex of said road wheel truss.

* * * * *